UNITED STATES PATENT OFFICE.

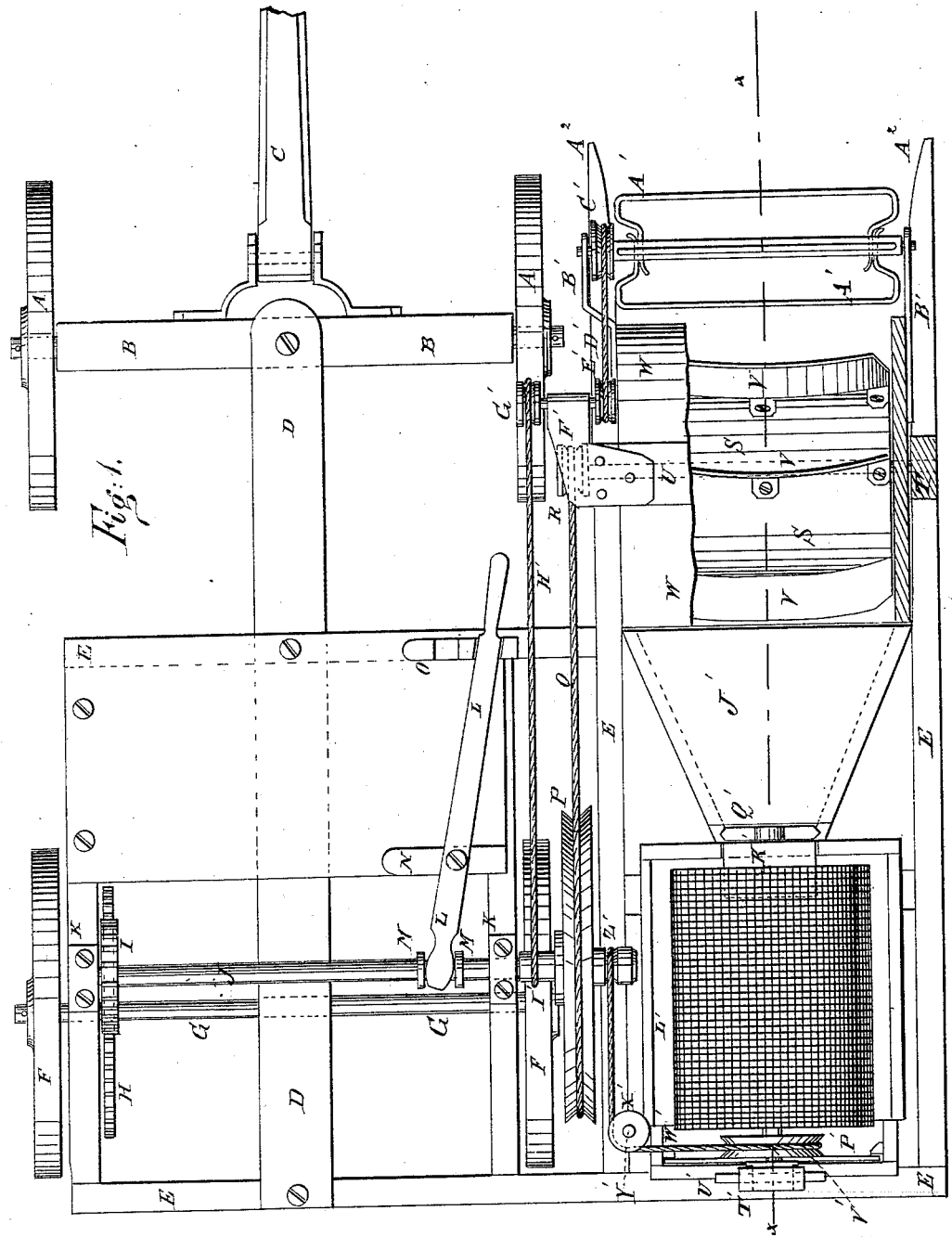

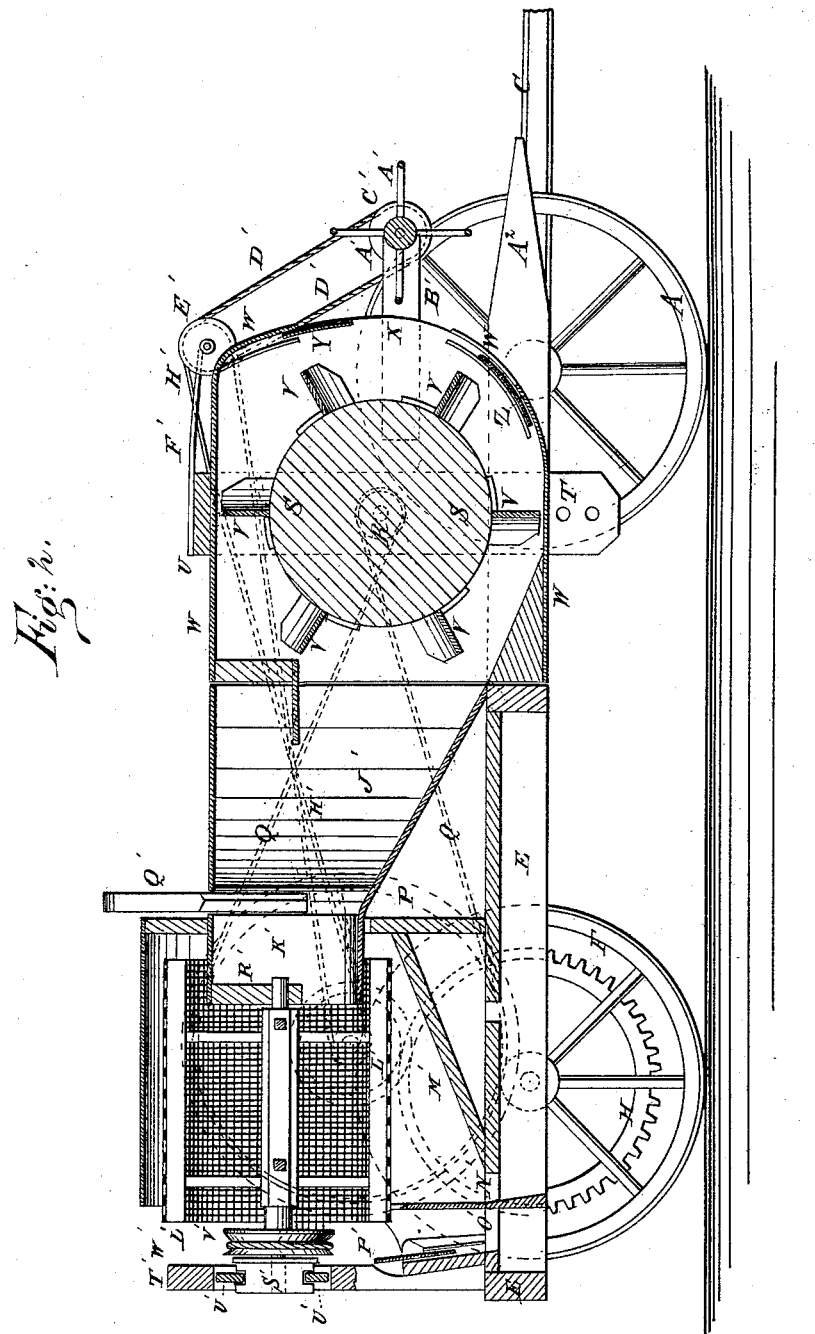

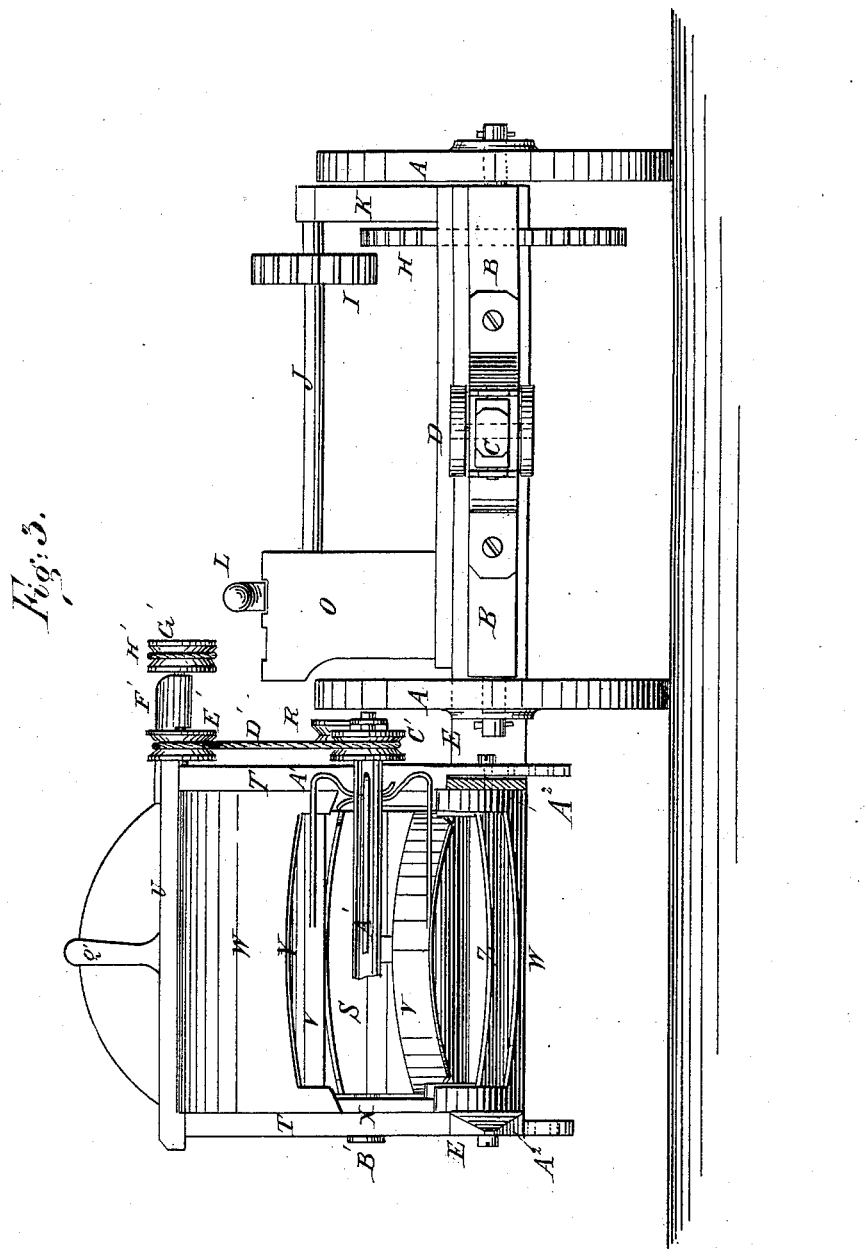

AUGUSTE N. VERDERY, OF ATLANTA, GEORGIA.

IMPROVEMENT IN COMBINED HARVESTING, THRASHING, AND CLEANING MACHINES.

Specification forming part of Letters Patent No. 223,195, dated December 30, 1879; application filed October 15, 1879.

*To all whom it may concern:*

Be it known that I, AUGUSTE NICOLA VERDERY, of Atlanta, in the county of Fulton and State of Georgia, have invented a new and useful Improvement in Machines for Harvesting, Thrashing, and Cleaning Standing Grain, of which the following is a specification.

Figure 1, Sheet 1, is a plan view of my improved machine, parts being removed. Fig. 2, Sheet 2, is a sectional side elevation taken through the line $x\ x$, Fig. 1. Fig. 3, Sheet 3, is a front elevation, part of the reel being broken away.

Similar letters of reference indicate corresponding parts.

The object of this invention is to furnish an effective machine for thrashing the heads of standing grain and cleaning the grain by a blast produced by the thrashing mechanism.

The invention consists in combining, with a reel and a case having mouth or inlet for the grain in the straw, a cylinder having teeth adapted to give a shear-cut and gather the heads inwardly toward the middle of the cylinder.

A represents the forward wheels, and B the forward axle, of the carriage. To the forward axle B is attached the tongue C, to which the draft is applied.

If desired, the tongue C may be omitted and the machine propelled by power applied to its rear side.

To the center of the axle B is pivoted the forward end of the reach D, to the middle and rear part of which is attached the frame E. F are the rear wheels of the carriage, which are rigidly attached to the rear axle, G, so as to carry the said axle G with them in their revolution. The axle G revolves in bearings attached to the frame E, and to the said axle G is attached a large gear-wheel, H, the teeth of which mesh into the teeth of the small gear-wheel I, attached to the shaft J. The shaft J revolves in standards K, attached to the frame E. The shaft J slides in its bearings, so that it may be moved longitudinally to throw the gear-wheel I out of and into gear with the gear-wheel H, as required. The shaft J is moved by a lever, L, the rear end of which is slotted to receive and ride upon the shaft J, and is kept in place upon the said shaft J by two collars or shoulders, $m$, attached to or formed upon the shaft J.

The lever L is pivoted to a standard, N, attached to the frame E, and its forward part moves across the wide upper end of the standard O, attached to the frame E. The upper end of the standard O has two notches formed in it to receive the lever L and hold the gear-wheel I in place when in gear and when out of gear with the gear-wheel H.

To the end of the shaft J is attached a large pulley, P, around which passes a belt, Q. The belt Q is crossed and passes around a pulley, R, attached to the journal of the thrashing-cylinder S. The journals of the cylinder S revolve in bearings in standards T, attached to the frame E, and the upper ends of which are connected by a cross-bar, U, to hold them in position. To the cylinder S are attached curved beaters V, to thrash the heads of grain.

The cylinder S is inclosed by a case, W, the forward and lower parts of which are curved. The curved forward side of the case W has a wide opening or mouth, X, formed in it to receive the heads of grain to be thrashed. The size of the mouth or opening X is regulated by slide-plates Y Z, which slide along the inner side of the case W, so that they may be adjusted to make the opening or mouth X wider or narrower, higher or lower, as the condition of the grain may require. The heads of the grain are forced through the mouth or opening X, to be thrashed by the reel A', the journals of which revolve in arms B', attached to the standards T or case W.

The bars of the reel A' are so formed as to move along the forward side of the case W, in front of the mouth X, and push the heads of the grain through the said mouth X, so that they will be struck and thrashed by the beaters V of the cylinder S. To one of the journals of the reel A' is attached a pulley, C', around which passes a belt, D'. The belt D' also passes around a pulley, E', pivoted to an arm, F', attached to the cross-bar U or standard T. To the journal of the pulley E' is attached a pulley, G', around which passes a belt, H'. The belt H' is crossed, and passes around a small pulley, I', attached to the shaft J, so that the reel may be driven by the advance of the machine.

The thrashed grain is driven by the blast produced by the revolution of the cylinder S V through the tapering chamber J' in the rear of said cylinder S V and into and through the flue K' into the screen L'. The grain falls through the meshes of the screen L' to the inclined board M', and escapes through the opening N' into a drawer, sack, or other receiver.

The chaff escapes through the rear end of the screen L', and the heads of grain that may have been broken from the stalks fall from the rear end of the screen and drop through the opening O' into a drawer, sack, or other receiver. At the rear side of the opening O' is placed a slide, P', which may be adjusted higher or lower, as may be required, to prevent the heads of grain from being carried over it to the ground.

The flue K' is provided with a slide, Q', which may be adjusted to regulate the blast through it. The screen L' is made cylindrical in form, and its forward journal revolves in a bearing, R', secured in the upper part of the flue K'. The rear journal of the screen L' revolves in a bearing, S', placed in a slot in a standard, T', and secured adjustably in place by keys U', driven through the said standard above and below the said bearing, as shown in Fig. 2, so that the pitch of the screen may be regulated, as may be required, by adjusting the keys U'.

To the rear journal of the screen L' is attached a pulley, V', around which passes a belt, W'. The belt W' passes around two guide-pulleys, X', pivoted to a rod, Y', attached to the frame E. From the guide-pulleys X' the belt W' passes to and around a pulley, Z', attached to the shaft J, so that the screen L' may be revolved by the advance of the machine.

To the forward part of the frame E are attached two guide-fingers, $A^2$, which project at the ends of the reel A', to guide the grain into the sweep of the reel A', so that the heads of the grain will be forced through the mouth or opening X in the case W and be thrashed by the beaters V of the cylinder S.

In case the weight of the carriage be not sufficient to balance the machine, one or more caster-wheels may be attached to the frame E to support the operating parts of the machine; or the axle G may be extended and its wheel F placed between the screen L' and the side bar of the frame E.

Having thus described my invention, I claim as new and desire to secure by Letters Patent—

The combination, in a combined thrasher and separator, of the cylinder S, having curved beaters V, adapted to give a shear-cut and at the same time to gather the heads inwardly toward the middle of the cylinder, the case having mouth X, and the reel A, arranged in front of said mouth, as shown and described.

AUGUSTE NICOLA VERDERY.

Witnesses:
S. LANDIS,
WELLBORN BRAY,
JOHN RHEA.